(12) United States Patent
Pomponio, Sr.

(10) Patent No.: US 6,550,589 B1
(45) Date of Patent: Apr. 22, 2003

(54) DRUM BRAKE SHOE ADJUSTER

(76) Inventor: Richard Allen Pomponio, Sr., P.O. Box 1445, Orofino, ID (US) 83544

( * ) Notice: Subject to any disclaimer, the term of this patent is extended or adjusted under 35 U.S.C. 154(b) by 0 days.

(21) Appl. No.: 09/976,375

(22) Filed: Oct. 10, 2001

(51) Int. Cl.[7] .............................................. F16D 51/00
(52) U.S. Cl. .................................................... 188/79.61
(58) Field of Search ........................... 188/79.51, 79.56, 188/79.57, 79.58, 79.59, 79.61, 79.62, 79.63, 79.64

(56) References Cited

U.S. PATENT DOCUMENTS

| | | | |
|---|---|---|---|
| 1,175,286 A | | 3/1916 | Meyers |
| 1,805,190 A | | 5/1931 | Semmes |
| 1,875,571 A | | 9/1932 | Delahaye |
| 2,002,813 A | | 5/1935 | Harper |
| 2,132,049 A | | 10/1938 | Schlumbrecht |
| 2,289,506 A | | 7/1942 | Kuebler |
| 2,918,797 A | | 12/1959 | Oswalt |
| 3,003,592 A | | 10/1961 | Kell |
| 3,196,987 A | | 7/1965 | Moore |
| 3,265,161 A | | 8/1966 | Croissant |
| 3,637,054 A | | 1/1972 | Billeter |
| 3,828,896 A | * | 8/1974 | Paimen .................. 188/196 A |
| 4,319,671 A | | 3/1982 | Smith et al. |
| 4,619,348 A | | 10/1986 | Smith |
| 4,623,046 A | | 11/1986 | Barnett et al. |
| 4,802,559 A | | 2/1989 | Fourie et al. |
| 5,411,119 A | | 5/1995 | Burton et al. |
| 5,497,859 A | * | 3/1996 | Nowosielski ........... 188/196 B |
| 5,685,399 A | | 11/1997 | Butler et al. |
| 5,713,437 A | * | 2/1998 | Furukawa et al. .......... 188/352 |
| 5,913,390 A | | 6/1999 | Hostetler |
| 5,979,613 A | | 11/1999 | Towers |
| 5,996,744 A | * | 12/1999 | Niki et al. .............. 188/196 D |
| 6,119,822 A | | 9/2000 | Baldwin |
| 6,209,689 B1 | | 4/2001 | Bohm |
| 6,213,258 B1 | | 4/2001 | Dupuis |
| 6,367,367 B1 | * | 4/2002 | Terada .................... 188/196 D |
| 2001/0003320 A1 | | 6/2001 | Asai |
| 2001/0003321 A1 | | 6/2001 | Sano |

* cited by examiner

*Primary Examiner*—Douglas C. Butler
*Assistant Examiner*—Benjamin A Pezzlo
(74) *Attorney, Agent, or Firm*—Law Office Of Duncan Palmatier

(57) ABSTRACT

The invention discloses a brake shoe adjuster. In a preferred embodiment, the invention discloses floating adjusters with a single adjusting rod. One specifically disclosed embodiment shows an hydraulic adjuster with an adjusting rod, forming a plunger or piston, in an hydraulic cylinder, and driven by grease forced into the cylinder by a grease gun through a zerk grease fitting. Another specifically disclosed embodiment shows a mechanical adjuster with a rod, forming a rack, driven by a pinion gear.

4 Claims, 4 Drawing Sheets

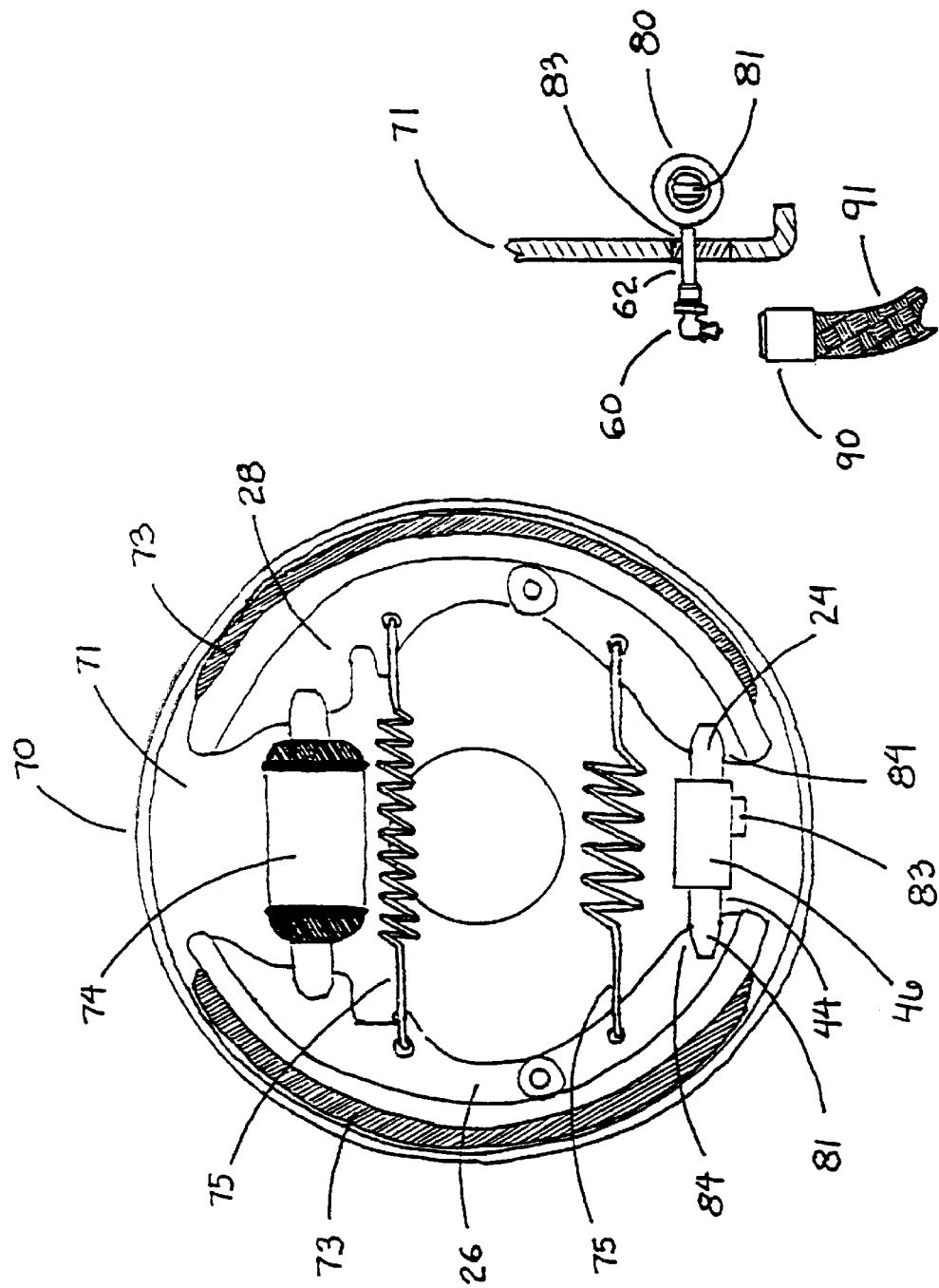

DRUM BRAKE SHOE ADJUSTER

The present invention discloses an improved drum brake shoe adjuster.

BACKGROUND OF THE INVENTION

1. Field of the Invention

This invention relates to drum brakes, and more specifically to an improved drum brake shoe adjusting device. The preferred embodiment of the disclosed invention is a floating adjuster with a single adjusting rod. One specifically disclosed embodiment shows an adjuster with an adjusting rod, forming a plunger or piston, in a cylinder, and driven by grease forced into the cylinder by a grease gun through a zerk grease fitting. Another specifically disclosed embodiment shows a mechanical adjuster with a rod, forming a rack, driven by a pinion gear.

2. Discussion of Prior Art

Screw-type devices for adjusting drum brake shoe clearance to accommodate brake shoe material wear are well-known in the prior art. These devices are used to adjust the clearance between the brake shoes, which carry the brake material, and the brake drum, in order to account for wearing of the brake material. In most prior art devices, the adjuster increases the distance between the ends of two shoes, thereby forcing the shoe pads into tighter clearance with the drum. In one very common prior art arrangement, manual adjustment is accomplished by inserting a brake spoon, screwdriver, or similar tool through a slot in the brake's back plate to reach a star wheel, which, when rotated, turns a threaded adjuster screw and changes the distance between the brake shoes and the drum.

However, these screw-type adjuster assemblies are often difficult to use, time-consuming, and can be dangerous as well. Problems with the screw adjusters typically arise because the back plate is too close to the vehicle's springs or frame to allow adequate room for operation of the brake spoon. For example, with many vehicles and trailers, the space between the backing plate and the leaf spring is so narrow that it is extremely difficult to insert the brake spoon through the slot in the brake back plate in order to engage and rotate the star wheel. Moreover, the mechanical adjuster parts are exposed to significant heat generated from the brake as well as to corrosive elements, such as rain, grit, road salt, and salt water, so that the parts rust and fuse. In the case of boat trailers, the drum brakes are often entirely submerged in water when the boat is launched or retrieved. Corrosion is a problem with many conventional adjusters especially because the parts are small and delicate in order to fit within the brake. If the star wheel has seized or frozen due to rust, dirt, or corrosion, the drum brake assembly must be completely removed in order to release or replace the adjuster. Thus, manually adjusting brakes using the screw-type adjusters can be time consuming and frustrating.

Moreover, conventional adjusters are also dangerous, because the vehicle on which the brakes require adjustment must be jacked up off the ground to allow for free rotation of the vehicle wheels to test the brake adjustment. With conventional adjusters, the person doing the brake adjustment must lie on the ground or stand under the jacked-up vehicle in order to operate the adjuster, which can only be reached from the inside of the wheel; that is, from under the vehicle or trailer. Thus, conventional drum brake adjustment is awkward and dangerous.

SUMMARY OF THE INVENTION

It is one object of the present invention to provide a brake shoe adjuster that will resist corrosion and seizing. It is another object of the present invention to provide a brake shoe adjuster that is protected against rust, dirt, water, corrosion, or other contamination. It is another object of the present invention to provide a brake shoe adjuster that is a sealed unit. It is another object of the present invention to provide a brake shoe adjuster that is safe to use. It is another object of the present invention to provide a brake shoe adjuster that can be used by a person standing next to the vehicle or trailer wheel rather than under it. It is another object of the present invention to provide a brake shoe adjuster that is easy, fast, and inexpensive to use.

In accordance with these objectives, the present invention provides a floating brake shoe adjuster that uses a single rod, in a sealed unit. In one preferred embodiment, an hydraulic adjuster comprises a cylinder housing, a chamber, a plunger or piston, a grease fitting, and a slotted adjusting ram connected to the piston which travels according to the amount of grease pumped into the chamber through the grease fitting. The slotted adjusting ram straddles a saddle at one end of a brake shoe. Another slotted ram at the opposite end of the cylinder housing rides against a saddle at the end of the other shoe. The adjuster is not fixed to the back plate, but is allowed to float. A grease gun is used to pump grease into the chamber through the grease fitting. The grease pumped into the chamber forces the piston out, thereby driving out the shoes against the drum. Because the adjuster floats, the shoes will center themselves, allowing a consistent clearance between the shoes and the drum. The grease fitting, often referred to as a "zerk" grease nipple, may be accessed by a grease gun with a hose, so that it is not necessary to be under the vehicle or trailer while performing the adjustment. Thus, it is possible to pump grease into the hydraulic adjuster from any desirable location, such as to the side of the vehicle.

In another preferred embodiment specifically, a mechanical adjuster comprises a housing, a pinion gear on a spring-loaded shaft, a gear rack, locking teeth, and a ram. The pinion shaft may be pushed in against the spring, freeing it from the locking gear, and allowing the shaft to be turned by conventional tools. Turning the pinion shaft drives the rack in or out of the housing. A slotted adjusting ram at one end of the rack straddles a saddle at one end of a brake shoe. Another slotted ram, fixed at the opposite end of the housing, straddles the end of the other shoe. As with the hydraulically powered embodiment, the adjuster is not fixed to the back plate, but is allowed to float. Thus, turning the pinion shaft can take up clearance between the shoes and the drum and the shoes will center themselves. Releasing pressure on the pinion shaft allows the spring to force the pinion gear into engagement with the locking teeth inside the housing, thereby fixing the proper adjustment.

BRIEF DESCRIPTION OF THE DRAWINGS

FIG. 1 is a head-on view of the inside of a drum brake, showing brake shoes mounted on a back plate and the adjuster of the present invention.

FIG. 2 is a cross section side view of a portion of a drum brake back plate, showing the position of the disclosed hydraulic adjuster and its zerk grease fitting, and showing the nozzle and hose of a grease gun.

DESCRIPTION

Figure 4:
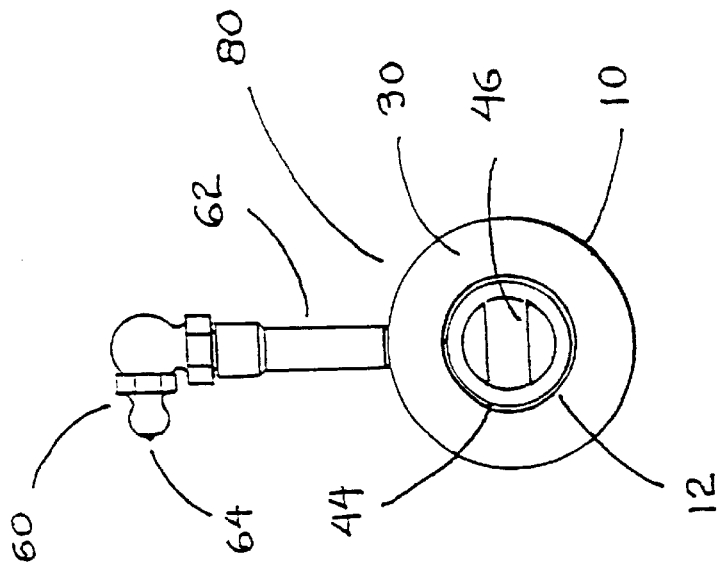
FIG. 4 is a head-on view of the hydraulic adjuster.

FIG. 1 shows a head on view of the inside of a drum brake (shown generally at 70). Two brake shoes (26 and 28) have brake linings (73) that can be forced against a brake drum (not shown) by an hydraulic brake cylinder (74) mounted to a back plate (71). Springs (75) pull the shoes (26 and 28) back, away from the drum. An adjuster (80) has slotted rams (46 and 24) at each end. The slotted rams (46 and 24) straddle saddles (84) at the ends of each of the shoes (26 and 28). The preferred embodiment disclosed here shows an adjuster (80) that is not fixed to the back plate (71), but is allowed to "float". One of the slotted rams (24) is fixed to the adjuster (80), but the other ram (46) forms a plunger or piston (40) that slides in a cylinder bore (12, seen in FIG. 3) in the adjuster (80). When the plunger (40) is forced out of the adjuster (80) under hydraulic pressure it forces the brake shoe (26) out. Since the adjuster (80) floats, as the shoe (26) is forced out against the drum (not shown) and against the pressure of the springs (75), both shoes (26 and 28) will center themselves with respect to the drum. FIG. 2 shows a slot (83) in drum's back plate (71), through which a shaft (62) from the adjuster (80) extends. At the end of the shaft (62) is a grease nipple, often referred to as a "zerk" fitting. The nozzle (90) of a grease gun (not shown) can be connected to the zerk fitting (60), and grease can be forced into the adjuster, forcing out the plunger (40). The nozzle (90) of a conventional grease gun is connected to the gun (not shown) by a flexible hose (91). Thus, from FIG. 2 it may be seen that the hydraulic adjuster (80) of the present invention may be reached by a grease nozzle (90) at the end of a hose (91). In this way, the person adjusting the brake may crouch to the side of the vehicle or trailer and use a grease gun to adjust the brake shoe clearance. It is not necessary for the person to get under the vehicle in order to perform this adjustment procedure, as with conventional systems.

Figure 3:
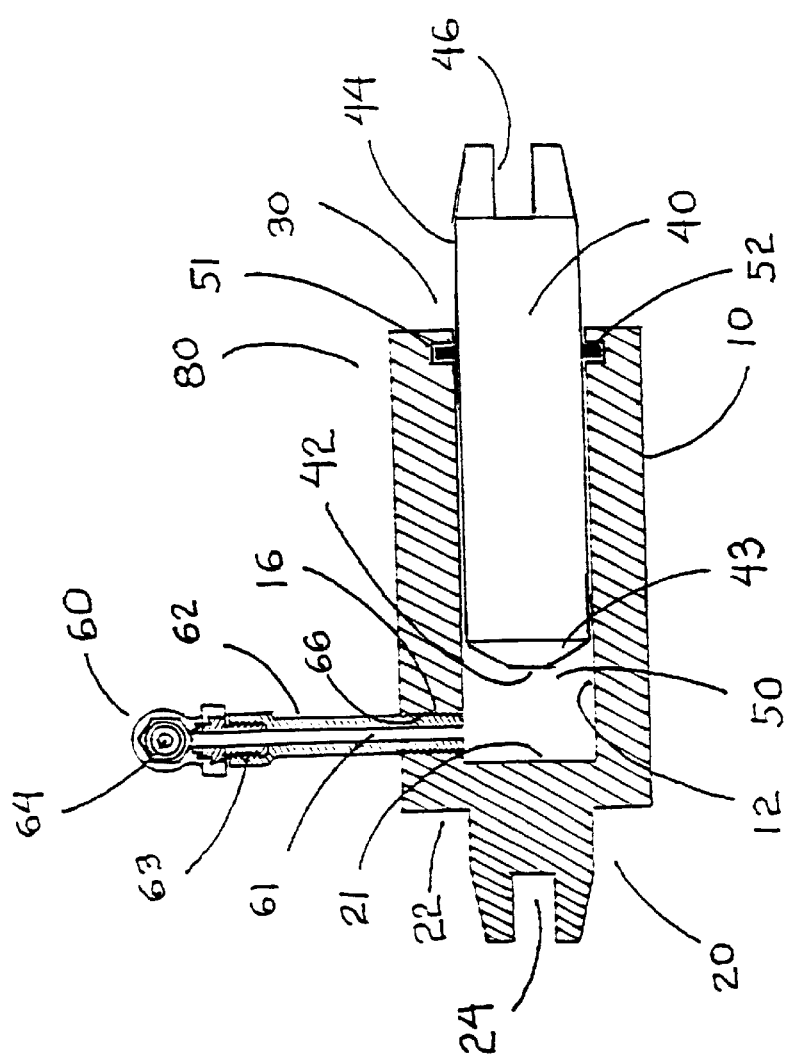
FIG. 3 is a cross section side view of the hydraulic adjuster.

FIG. 3 shows the structure of the disclosed hydraulic adjuster (80). The adjuster has a cylindrical housing (10) consisting of a solid end (20) and a plunger end (30). The cylindrical housing (10) has a bore (12) and an inner face (21). A threaded hole (16) adjacent the inner face (21) of the housing (10) accesses the bore (12) and receives one threaded end (66) of a hollow grease shaft (62). At the plunger end (30) of the housing (10) the plunger (40) may be inserted into the bore (12). At closed end of the bore (12) is the inner face (21). The plunger (40) has an outer diameter (44), an end with a slotted stud (46), and a tapered end (43) terminating in a face (42). The outer diameter (44) of the plunger (40) slides in the cylindrical bore (12). The tapered end (43) prevents the plunger's outer diameter (44) from blocking the access hole (16). In a preferred embodiment, an O-ring (52) is located in an annular groove (51) in the cylinder bore (12), providing a seal between the bore (12) and the plunger (40). The plunger (40) has a tapered end (43) and a piston face (42) at one end and a slotted ram (46), designed to engage a saddle (84, seen in FIG. 1) of a brake shoe (26, seen in FIG. 1), at the other end. The tapered end (43), piston face (42), the bore (12), and the inner face (21) form a chamber (50) into which grease (not shown) may be pumped through the access hole (16). Pumping grease into the chamber (50) forces out the plunger (40), permitting adjustment of the brake shoes. The solid end (20) of the adjuster (80) has another slotted ram (24), which engages the other brake shoe (28). The adjuster (80) is preferably made of stainless steel or an alloy, such as aluminum, that will resist corrosion.

Figure 7:
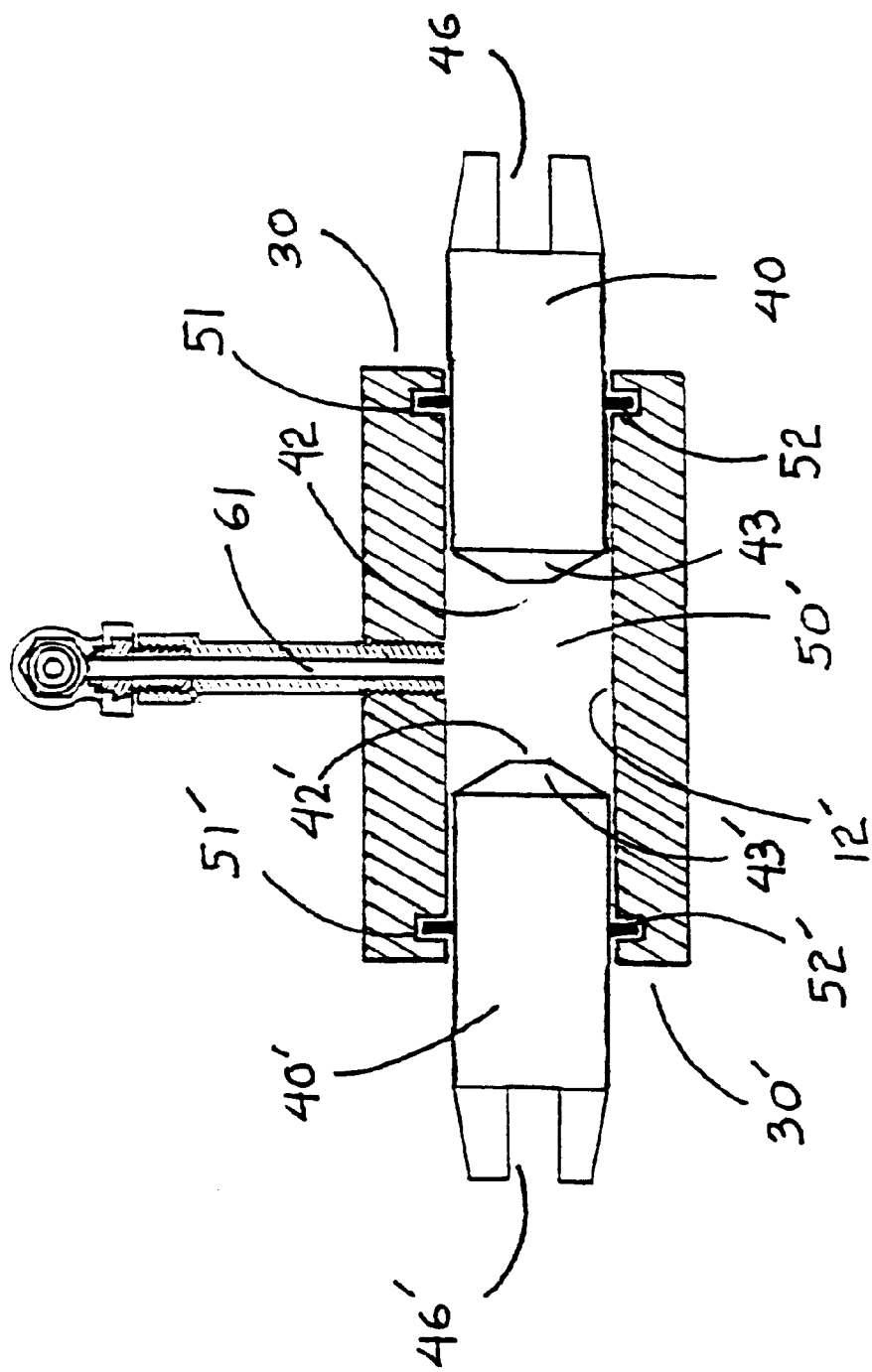
FIG. 7 is a cross section view of an alternative embodiment of the hydraulic adjuster.

FIG. 7 shows an alternative embodiment of the disclosed hydraulic brake adjuster. Rather than an adjuster with a single plunger (40), FIG. 7 shows an hydraulic adjuster with double acting plungers (46 and 46'). The cylindrical housing (10) forms an open bore (12'), and the twin plungers (46 and 46'), which are received at each end of the cylinder, form the chamber (50'). Grease is pumped into the chamber (50') through the bore (61) of the grease shaft (62), forcing each plunger (46 and 46') out. The second plunger (46') has a slotted ram (46') that straddles the saddle (84, seen in FIG. 1) of one of the brake shoes (26, seen in FIG. 1). This embodiment allows an hydraulic adjuster to be mounted solidly to a drum brake's back plate (71, seen in FIG. 1).

Conventional drum brakes have a hole in the back plate (71) to access a prior art star wheel adjuster with a brake spoon. The present invention may be used with existing drum brakes by using the brake spoon access hole as the slot (83) for the grease shaft (62). The grease shaft (62) has outer threads at one end (66) so that the shaft (62) can be screwed into the threaded access hole (16) of the cylinder housing (10). The shaft (62) is hollow, forming a bore (61) for grease or hydraulic fluid. Inner threads (63) at the other end of the shaft (62) receive a conventional zerk fitting (60). The zerk fitting (60) shown in FIGS. 1, 2 and 3 has a ninety degree turn, which allows a grease gun nozzle (90) to reach the fitting (60) parallel flush with the brake back plate (71). This arrangement avoids any clearance problems in the limited space between the brake back plate (71) and the vehicle or trailer's suspension (not shown), which is a nagging problem with conventional drum brake adjusters.

The manner of using the drum brake shoe hydraulic adjuster of the instant invention to account for pad wear is simple. Once brake lining (73) wear creates the need for adjustment, the vehicle or trailer must be jacked up so that the wheels are free to rotate when turned by hand. With the present invention, once the vehicle is jacked off the ground, the person doing the adjustment need not lie on the ground or stand beneath the vehicle, as with conventional adjusters. Instead, adjusting the brakes in accordance with the instant invention may be accomplished while standing or crouching to the side of the vehicle. Conventional "eighth-inch" grease guns have a length of hose (91) with a nozzle (90) at the end. The hose (91) allows the nozzle (90) to be connected to an eighth-inch grease zerk (60) while the operator stands to the side of the vehicle and pumps grease into the adjuster (80). With the grease gun nozzle (90) in place, grease is pumped into the adjuster (80) in small amounts while the vehicle's wheel (not shown) is rotated. Once a slight drag of brake shoes (26 and 28) on the drum (not shown) is felt, the brake has been adjusted properly. If too much grease is pumped into the adjuster (80) and the shoes (26 and 28) become too tight to the drum, the drag will be too great and must be remedied. To do this, the spring-loaded ball valve (64) of the zerk fitting (60) can be manually depressed to allow grease to back out under the pressure of the brake's (70) springs (75). Alternatively, the grease zerk (60) may be unscrewed, allowing grease to be forced out under the pressure of the brake's (70) springs (75).

Figures 5, 6:
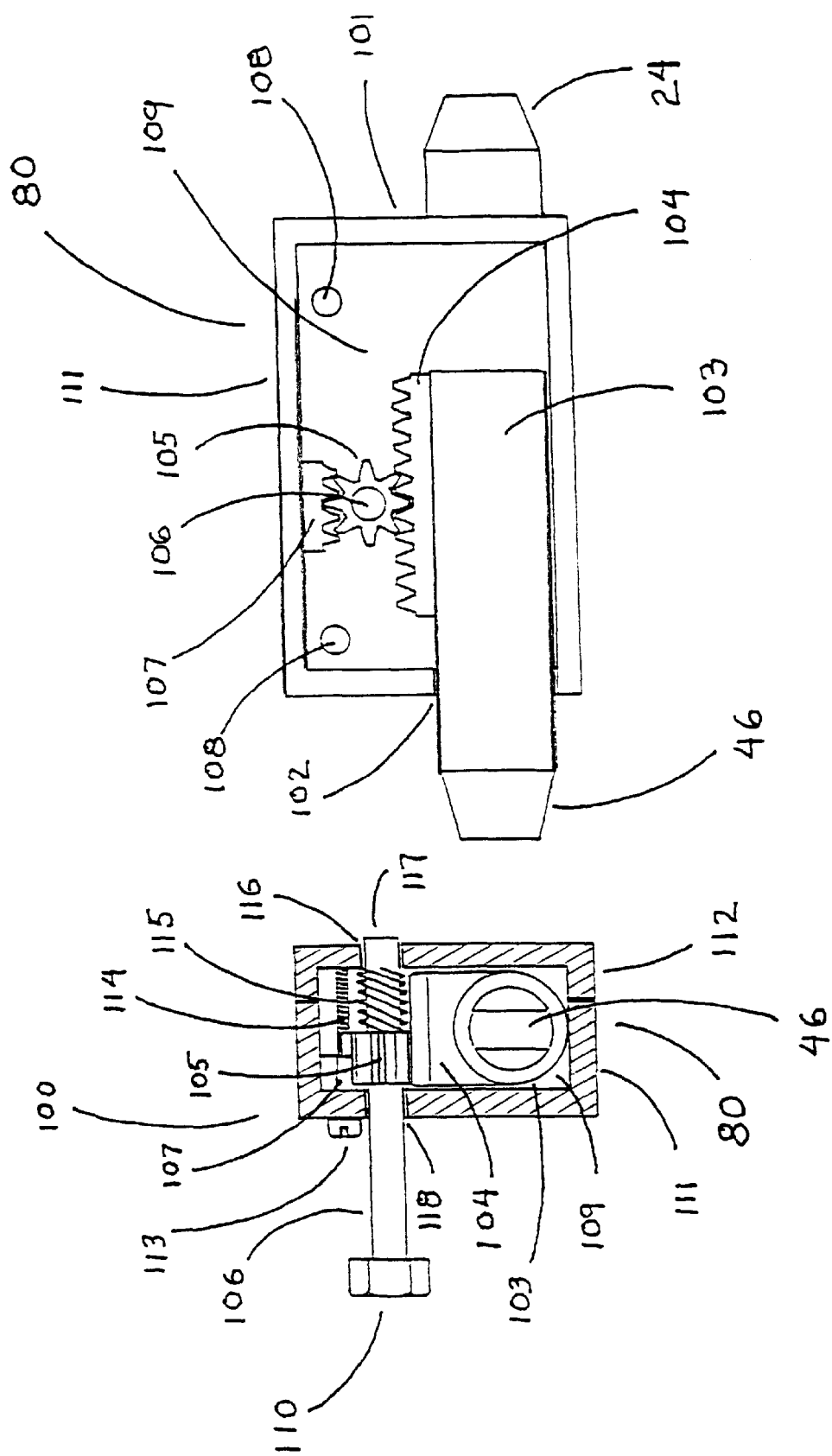
FIG. 5 is a cross section view of the mechanical adjuster.
FIG. 6 is a cross section side view of the mechanical adjuster.

An alternative embodiment of the present invention is shown in FIGS. 5 and 6. This disclosed embodiment also uses a floating adjuster (80) and a single adjusting rod (103). The adjuster housing (shown generally at 100) is formed by a box (111) and a lid (112). At the rear (101) of the box (111) has a fixed slotted ram (24) that straddles the saddle (84, seen in FIG. 1) of one brake shoe (28, seen in FIG. 1). At the other end of the box (111) is an opening (102) for the adjusting ram (103). A rack of gear teeth (104) atop the adjusting ram (103) engages a pinion gear (105). As the pinion gear (105) is rotated on the rack (104), the adjusting ram (103) will move in or out of the box (111). Another slotted ram (46) at the end of the adjusting ram (103) straddles the saddle (84, seen in FIG. 1) of other brake shoe (26, seen in FIG. 1). A set of locking gear teeth (107) fixed to the inside of the box (111) locks the pinion gear (105) and rack (104) in place. The pinion gear (105) rides on a shaft (106). As seen in FIG. 5, at one end of the shaft is a head (110) formed as a conventional hexagonal bolt head. Common wrenches may be used on the head (110) to turn the pinion shaft (106). The pinion shaft (106) enters the box (111) through a hole (118), extends beyond the pinion gear (105), and extends through another hole (116) in the lid (112). A coil spring (115) forces the pinion gear (105) into the locking gear teeth (107). Screws (113) extend through holes (108) in the box (111) and engage threaded holes (not shown) in the lid (112) to hold the box (111) and lid (112) together. To operate the mechanical adjuster, a common socket wrench may be connected to the head (110) of the pinion gear shaft (106). As with the grease shaft (62) of the hydraulic adjuster shown in FIG. 2, the pinion gear shaft (106) of the mechanical adjuster is extended through the slot (83) in a drum brake's back plate (71). And, as with the hydraulic adjuster described above, the brake spoon hole provided in the back plates of conventional drum brakes may be used for the pinion gear shaft (106) of the mechanical adjuster described here. In cases where the brake spoon hole of a conventional drum brake is not aligned for hydraulic shaft (62, seen in FIG. 2) or pinion gear shaft (106) of the disclosed adjuster (80), the brake spoon hole may be enlarged by cutting or drilling. Once a socket wrench (not shown) is connected to the head (110) of the pinion gear shaft (106), the shaft (106) is pushed in against the spring (115), freeing the pinion gear (105) from the locking gear teeth (107). With the pinion gear (105) free, the wrench can be turned, thereby turning the pinion gear (105) on the rack (104) and driving the adjusting ram (103) in or out.

The drawings and description set forth here represent only some embodiments of the invention. After considering these, skilled persons will understand that there are many ways to make a drum brake shoe adjuster according to the principles disclosed. The inventor contemplates that the use of alternative structures, materials, or manufacturing techniques, which result in a drum brake shoe adjuster according to the principles disclosed, will be within the scope of the invention.

What I claim is:

1. A floating drum brake shoe adjuster comprising:

a drum brake back plate having an adjuster access passage, a drum brake shoes mounted to the back plate, an hydraulic cylinder having an outer body and one open end, a closed end, and a bore formed between the open and closed ends of the cylinder, and a grease access passage adjacent to the closed end of the bore, and a ram portion, located on the outer body of the closed end of the cylinder, for engaging a drum brake shoe, a hollow access shaft having a cylinder end and a grease fitting end, wherein the cylinder end is connected to the grease access passage, and a grease fitting is connected to the grease fitting end, and wherein the shaft extends through the adjuster access passage of the back plate, a plunger slidably riding in the bore, wherein the plunger has a piston end and a ram end for engaging a drum brake shoe, and wherein the piston end is tapered to prevent the plunger from blocking the grease access passage, and wherein the cylinder is not fixed to the back plate and can float.

2. A floating drum brake shoe adjuster comprising:

a drum brake back plate having an adjuster access passage, a pair of drum brake shoes mounted to the back plate, a floating hydraulic cylinder having an open end and a closed end forming a bore, wherein the bore has an annular groove adjacent the open end for receiving an O-ring, and wherein the closed end has a slotted ram for engaging one of the pair of drum brake shoes, a passage adjacent the closed end of the cylinder affording fluid access to the bore, a fluid valve connected to the passage by a fluid valve passage, wherein the valve allows fluid to be pumped into the bore, and wherein the fluid valve is accessible through the adjuster access passage, and a plunger slidably riding in the bore, wherein the plunger has a piston end and a ram end for engaging a second of a pair of drum brake shoes, and wherein the piston end is tapered.

3. The drum brake shoe adjuster of claim 2 wherein the fluid valve is a grease fitting.

4. A floating drum brake shoe adjuster comprising:

a drum brake back plate, a pair of drum brake shoes mounted to the back plate, a floating hydraulic cylinder having an open end and a closed and forming a bore, wherein the bore has an annular groove adjacent the open end for receiving an O-ring, and wherein the closed end has a slotted ram for engaging one of the pair of drum brake shoes, a passage adjacent the closed end of the cylinder affording grease access to the bore, a grease fitting connected to the passage by a grease shaft, wherein the grease fitting allows grease to be pumped through the shaft and into the bore, an adjuster access passage in the back plate through which the grease shaft extends, wherein the adjuster access passage is of sufficient size to permit the grease shaft clearance to allow the hydraulic cylinder to float between the brake shoes, and a plunger slidably riding in the bore, wherein the plunger has a piston end and a ram end for engaging a second of a pair of drum brake shoes, and wherein the plunger's piston end is tapered to prevent the plunger from blocking the passage.

* * * * *